United States Patent [19]

Kalfoglou et al.

[11] Patent Number: 5,251,698
[45] Date of Patent: Oct. 12, 1993

[54] METHOD OF USING LIGNOSULFONATE-ACRYLIC ACID GRAFT COPOLYMERS AS SACRIFICIAL AGENTS FOR SURFACTANT FLOODING

[75] Inventors: George Kalfoglou; Grover S. Paulett, both of Houston, Tex.

[73] Assignee: Texaco Inc., White Plains, N.Y.

[21] Appl. No.: 903,114

[22] Filed: Jun. 23, 1992

[51] Int. Cl.$^5$ .............................................. E21B 43/22
[52] U.S. Cl. .................................. 166/274; 166/273; 252/8.554
[58] Field of Search ............... 166/273, 274, 275, 268; 252/8.554; 507/108, 119

[56] References Cited

U.S. PATENT DOCUMENTS

| | | | |
|---|---|---|---|
| 4,133,385 | 1/1979 | Kalfoglou | 166/273 |
| 4,157,115 | 6/1979 | Kalfoglou | 166/274 |
| 4,196,777 | 4/1980 | Kalfoglou | 166/274 X |
| 4,235,290 | 11/1980 | Kalfoglou | 166/274 X |
| 4,271,906 | 6/1981 | Bousaid et al. | 166/274 X |
| 4,479,542 | 10/1984 | Warchol et al. | 166/273 |
| 4,676,317 | 6/1987 | Fry et al. | 166/293 |
| 4,721,161 | 1/1988 | Richardson et al. | 166/295 |
| 4,836,940 | 6/1989 | Alexander | 175/72 X |
| 5,009,268 | 4/1991 | Kalfoglou | 166/274 |

*Primary Examiner*—Stephen J. Novosad
*Attorney, Agent, or Firm*—James L. Bailey; Jack H. Park; Harold J. Delhommer

[57] ABSTRACT

A sacrificial agent method employing lignosulfonate-acrylic acid graft copolymers to reduce chemical loss to the formation during hydrocarbon recovery by surfactant system injection and sweep through an underground formation.

9 Claims, No Drawings

METHOD OF USING LIGNOSULFONATE-ACRYLIC ACID GRAFT COPOLYMERS AS SACRIFICIAL AGENTS FOR SURFACTANT FLOODING

BACKGROUND OF THE INVENTION

This invention relates to a method of injecting chemicals into a hydrocarbon reservoir for the purpose of increasing hydrocarbon recovery. More particularly, the invention pertains to the use of a lignosulfonate-acrylic acid graft copolymer sacrificial agent to decrease adsorption of surfactants and polymers within hydrocarbon reservoirs.

One of the most vexing problems in the use of surfactant flooding for enhanced oil recovery is the frequent, substantial loss of surfactant due to adsorption on the formation matrix and precipitation by polyvalent cations such as calcium and magnesium. A significant percentage of surfactants are also physically entrapped within the pore spaces of the rock matrix. Of chief concern is surfactant adsorption on the formation matrix which significantly decreases surfactant flood efficiency, making it necessary to inject a greater quantity of surfactant and increasing the cost of any surfactant flood.

Additionally, most surfactants are satisfactory for surfactant flooding only if the calcium and magnesium concentrations of the formation water fall below about 500 ppm. Petroleum sulfonates, the most popular type of surfactants, precipitate where divalent ion concentrations exceed about 500 ppm. Such precipitation renders the sulfonates inoperative for recovering oil and in some instances, causes formation plugging.

The main cause of surfactant loss is adsorption within the formation due to physical contact of the surfactant with the formation matrix or entrapment within pores of the matrix. Surfactant systems contacting carbonate or sandstone matrices encounter a range of adsorptive sites. Adsorption can be a particularly vexing problem with a sandstone formation.

The most promising approach for reducing the amount of surfactants retained by the formation matrix has been to use sacrificial agent compounds, either in a preflush solution injected before the surfactant-containing solution, or in the surfactant solution. The compounds are sacrificial in that their adsorption on the formation matrix and entrapment within the pore spaces of the formation reduces the loss of the more expensive surfactants, solubilizers and polymers contained within the surfactant solutions.

Various chemicals have been employed as sacrificial agents to decrease the adsorption of surfactants or to tie up polyvalent cations and prevent them from precipitating surfactants from the flooding medium. Lignosulfonates form one class of compounds which have been found to have excellent properties as sacrificial agents. They are economically attractive because they are by-products of the pulp industry. Supply is plentiful and product costs are much less than the costs of surfactants employed in enhanced oil recovery floods.

The use of various lignosulfonates has been disclosed extensively in the literature. U.S. Pat. Nos. 4,157,115, 4,235,290 and 4,271,906 disclose several methods of using aqueous solutions of lignosulfonate salts as sacrificial agents. The use of oxidized lignosulfonates is disclosed in U.S. Pat. Nos. 4,133,385 and 4,196,777. Chrome lignosulfonates as sacrificial agents are described in U.S. Pat. No. 4,142,582. U.S. Pat. Nos. 4,172,497 and 4,267,886 disclose the use of lignosulfonates carboxylated with chloroacetic acid and U.S. Pat. Nos. 4,172,498 and 4,269,270 disclose sulfomethylated lignosulfonates as sacrificial agents. U.S. Pat. Nos. 4,249,606 and 4,384,997 teach the use of lignosulfonates carboxylated with carbon dioxide and halocarboxylic acid, respectively, as sacrificial agents. U.S. Pat. Nos. 4,236,579 and 4,344,487 disclose the sacrificial agent use of lignosulfonates modified by a variety of chemical reagents. U.S. Pat. No. 4,479,542 describes a sacrificial afterflush method employing lignosulfonates. A mixture of lignosulfonate and polyalkylene glycol is disclosed for sacrificial purposes in U.S. Pat. No. 5,009,268. However, most of these lignosulfonate derivatives suffer from the disadvantage of being too expensive to use as sacrificial agents in a surfactant flood because of the costly chemical modification reactions involved.

Lignosulfonate-acrylic acid copolymers have been found to be useful for a number of purposes. U.S. Pat. Nos. 3,985,659; 4,322,301; 4,374,738; 4,521,578 and 4,836,940 describe their utility in drilling fluids. U.S. Pat. No. 4,721,166 discloses the use of such copolymers to form an in situ gel to decrease permeability around a wellbore.

Changes in surfactant flooding in the last decade have shown that mobility control polymers are required to improve the sweep efficiency, and thus the oil recovery efficiency, of a surfactant flooding system. U.S. Pat. No. 4,271,907 among others discloses the addition of a mobility control polymer to a surfactant system to increase oil recovery efficiency. However, mobility control polymers are incompatible with many sacrificial agent systems. For example, a mixture of alkoxylated cellulose or starch with high molecular weight mobility control polymers such as polysaccharides or polyacrylamides results in phase separation. Phase separation renders surfactant flooding systems useless for efficient oil recovery.

SUMMARY OF THE INVENTION

The disclosed invention is a method of recovering hydrocarbons by surfactant flooding wherein a sacrificial agent is injected into the formation in a concentration of about 0.02% to about 5% by weight of a lignosulfonate-acrylic acid graft copolymer containing about 2% to about 70% acrylic acid by weight.

The solution of sacrificial agents is injected into the formation to decrease the loss of more costly surfactant, solubilizer and polymer to the formation. The invention sacrificial agent system is preferably injected into the hydrocarbon formation in conjunction with the surfactant system, but may also be injected prior to or after the injection of the surfactant system.

DETAILED DESCRIPTION

In carrying out the invention, a solution containing about 0.02% to about 5%, preferably about 0.1% to about 3% by weight of a lignosulfonate-acrylic acid graft copolymer is injected as a sacrificial agent through one or more injection wells into a hydrocarbon formation. A surfactant system, with or without a polymer drive fluid, is injected into the formation to sweep hydrocarbons to a production well for recovery. The surfactant system may take any of the forms known to those skilled in the art including a microemulsion. The sacrificial copolymer is injected concurrently with the chemicals of the surfactant, or prior to or after the chemicals sought to be protected, whether they be surfactants, solubilizers or polymers.

The sacrificial material is injected in a manner to occupy or cover substantially all potential adsorption or retention sites of the rock within the hydrocarbon formation, thereby reducing the loss of injected surfactant, solubilizer and polymer. The phrase "adsorption sites" of the matrix or formation rock is used to mean those portions of the formation rock surface, including matrix pores, which are capable of adsorbing or entrapping a chemical compound from a solution on contact.

The highly undesirable loss of surfactant in chemical flooding may generally be attributed to two main phenomena. The first phenomenon is chemical removal or inactivation of the surfactant after contact with polyvalent cations or other materials dissolved in the formation fluids. Frequently, the end result is precipitates which leave less surfactant in solution and which lower formation permeability. The second phenomenon is adsorption within the formation due to physical contact of the surfactant with the formation matrix or entrapment within pores of the matrix. It is believed that both phenomena exist simultaneously to varying degrees in most chemical flooding operations.

It is believed that sacrificial agents generally work by one or more of several chemical mechanisms. However, it must be emphasized that these chemical mechanisms are theoretical and the extent to which any one of these mechanisms may be responsible for the effectiveness of a sacrificial agent is unknown. One possible sacrificial mechanism is the complexing of the sacrificial agent with polyvalent cations in solution, both by neutral and by charged sacrificial complexing agents. To the extent that the sacrificial agent complexes with polyvalent cations in the formation fluids, there will be less polyvalent cations left for the surfactant to interact with.

A second possible mechanism is the electrostatic attraction of the matrix and the sacrificial agent for each other. This is predominantly controlled by the surface charge at the multitudes of matrix adsorption sites. The electrostatic attraction mechanism is highly dependent upon the composition of the formation matrix. For instance, sandstones which may contain many different types of clays, will have different types of attractions for sacrificial agents and surfactants.

A third possible sacrificial mechanism arises from the fact that polymers have many functional groups and may attach themselves to the rock surface at plural sites, thereby blocking access to other sites on which injected surfactants, solubilizers and polymers could adsorb. In this manner, the large size of polymer molecules may block entrances to very small pores where much of the surface area and many adsorption sites lie.

Furthermore, the character of the formation matrix, be it carbonate, bentonite, kaolinite or something between these three disparate types of substrates, also has a significant impact upon the effectiveness of the sacrificial material. Sacrificial agents which are highly effective in limestone reservoirs may be ineffective when employed in sandstone formations. For instance, polyalkylene glycols, which are known to be effective sacrificial agents in most environments, are more effective in sandstone than carbonate reservoirs. The present invention of using lignosulfonate-acrylic acid graft copolymers is substantially more effective at reducing surfactant loss in carbonate or limestone reservoirs than in a sandstone reservoir. Obviously, the chemical structure of the sacrificial agent effects its performance in different reservoirs. Finally, the surfactant itself that is employed also alters adsorption, but it is generally not as critical as the type of formation matrix.

The lignosulfonate-acrylic acid graft copolymers used in the invention method may be prepared by a free radical reaction in which a vinyl monomer such as acrylic acid is polymerized with the lignosulfonate in the presence of a free radical initiator such as hydrogen peroxide and iron sulfate or other well-known free radical initiators. The graft copolymers contain bout 2% to about 70%, preferably about 5% to about 40% acrylic acid (or acrylate, depending upon pH) by weight. This polymerization to form lignosulfonate-acrylic acid graft copolymers is described in U.S. Pat. Nos. 3,985,659; 4,276,077; 4,322,301; 4,374,738; 4,387,205; 4,676,317; and 4,891,415.

The copolymers have large numbers of carboxylate groups which increase carbonate reservoir performance. The sulfonate groups permit the copolymers to be used in hard brines.

Last, but not least, both monomers are relatively cheap. Further, the polymerization is easy to carry out and requires no purification. Since acrylic acid is the more expensive component and since the examples show some correlation of increasing performance with increasing acrylic acid content, a balance must be struck between performance and cost for a particular surfactant flood. The cost of the graft copolymers range from about $0.15 to $0.80/lb depending on the acrylic acid content. Solubilized petroleum sulfonate systems cost over $1/lb.

The term "lignosulfonate" encompasses sulfite "lignin" as well as "sulfonated lignin" products. The term "lignin" has its normal connotation, and refers to the substance which is typically recovered from alkaline pulping black liquors, such as are produced in the Kraft, soda and other well known alkaline pulping operations. The term "sulfonated lignin" refers to the product which is obtained by the introduction of sulfonic acid groups into the lignin molecule, as may be accomplished by the reaction of the lignin with sulfite or bisulfite compounds, so that lignin is rendered soluble in water. These are macromolecules built up by complex condensation of phenyl propane units with sulfonate groups attached to the aliphatic side chain. They are water soluble with molecular weights ranging from several thousand to about 50,000 or more. The lignosulfonates most preferred to form the copolymers have a molecular weight of about 10,000 to 40,000.

Preferably, the sacrificial agent is coinjected into the subterranean formation in solution with the surfactant and solubilizer slug. The invention sacrificial agent may also be injected prior to the injection of the surfactant system or after the injection of the surfactant system, but an injection in solution with the surfactant and polymer system or systems is preferred.

When a lignosulfonate is coinjected with a surfactant slug, the lignosulfonate molecules have a tendency to move ahead of the surfactant. It is believed that this tendency is due to the much larger size of the lignosulfonate molecules compared to the surfactant molecules. The large graft copolymers of the invention method are just as likely to exhibit this behavior. The larger molecules will pass up many of the smaller rock pores and the smaller surfactant molecules will interact more with the rock matrix. Thus, it may be desirable to inject some sacrificial agent immediately behind the surfactant as well as with the surfactant slug to insure that all of the surfactant slug is adequately protected by the sacrificial agent system.

When sacrificial agents are used in a preflush solution and injected prior to the surfactant system, the length of time before oil recovery is increased since the sacrificial agents will not recover any oil. Any extra time imposed by the flooding process before additional oil recovery may significantly reduce the overall economics of the process. In addition, preflushes in general are often not as effective as expected because of conformity problems and large reservoir volumes. There is no assurance that the flow path of the surfactant solution will sufficiently coincide with that of the preflush sacrificial agent solution.

The performance of postflushes of sacrificial agents may also suffer where a sacrificial agent solution is injected into the reservoir after the injection of the surfactant or polymer system. With a postflush injected after the surfactant system, less surfactant will generally be recovered from the formation because the surfactant system will have already occupied many of the adsorption sites in the matrix and the sacrificial agent will be unable to desorb surfactant and occupy as many adsorption sites as in a preflush or concurrent injection scheme.

Both the sacrificial agent system and the surfactant formulation may be injected into the subterranean hydrocarbon formation in an aqueous solution or a non-aqueous solution with a hydrocarbon solvent, depending upon other requirements. When the sacrificial agent system is injected in a mixture with the surfactant or micellar formulation, it is necessary that the admixture be phase stable. Chromatographic separation complications can be minimized by introducing the sacrificial agent system in both the surfactant slug and in the trailing mobility control polymer slug.

The quantity of sacrificial agent system to be injected should be sufficient to occupy or cover substantially all of the active adsorption sites of the formation matrix in order to achieve a maximum reduction in the amount of surfactant loss to the formation. If less than this optimum amount is used, the corresponding reduction and surfactant loss to the formation will not be as great as in the case where the formation adsorption sites were completely saturated. A balance must be struck with the economics of the surfactant flood. This will most often be between about 0.01 and 0.5 pore volumes of sacrificial agent solution. Of course, the use of excess sacrificial agent materials will substantially increase the cost of the chemical flood.

The tailoring of a surfactant flood and the use of a sacrificial agent will vary with the mineral composition of the formation, the thickness of the formation, the pattern area to be swept and various other formation characteristics. Process design data coupled with field experience can determine the approximate quantity of sacrificial agent system needed for best results. But it should be noted that surfactant losses in the field have been found to be invariably higher than the projected losses from laboratory work. This is particularly so when the formation matrix contains large quantities of clays.

Thus, considerable knowledge of the formation matrix and formation fluids is necessary in order to determine the optimum amount of sacrificial agent system of lignosulfonate-acrylic acid graft copolymer to be injected to achieve the maximum economical reduction in surfactant loss. If the hydrocarbon formation is relatively clean carbonate lacking substantial clay content, significantly smaller quantities of sacrificial agent will be needed than in the case where the formation contains large amounts of highly adsorbent clays.

The effectiveness of using a sacrificial agent of lignosulfonate-acrylic acid graft copolymer for reducing surfactant, solubilizer and polymer loss in chemical flooding operations is demonstrated by the following examples. These examples are presented for illustrative purposes only and should not be construed to limit the scope of the invention, which is defined in the claims that follow.

EXAMPLES 1-4

The static bottle adsorption tests noted in Examples 1-4 of Table 1 were performed with an ethoxylated sodium sulfate solubilizer (LN-60COS) having an average of about six ethylene oxide groups ($C_{12-14}(EO)_6$-$SO_4Na$) and a solubilizer surfactant system composed of 0.9 wt % TRS-18, 0.9 wt % TRS-40, and 0.7% LN-60COS by weight.

TRS-18 is a trademarked oil soluble sulfonate surfactant sold by Witco Chemical Co. having an equivalent weight of about 500. TRS-40 is a trademarked water soluble petroleum sulfonate surfactant sold by Witco Chemical Co. having an equivalent weight of about 350. LN-60COS is a trademarked sulfated $C_{12-14}$ alcohol with an average of about six ethylene oxide groups provided by Texaco Chemical Co.

The brine contained 67,576 ppm TDS (total dissolved solids) including 3744 ppm divalent ions of calcium and magnesium. The tests were performed with a crushed San Andres outcrop core (limestone) having a mesh size between 40 and 100. The test temperature was 104° F. and surfactant concentrations were measured using ASTM Method D3049-89. The lignosulfonate-acrylic acid graft copolymer employed as a sacrificial agent in these tests was a private sample obtained from Georgia-Pacific Corporation containing 5.66% by weight acrylic acid. The lignosulfonate monomer was a calcium salt of Lignosite 100, a trademarked softwood lignosulfonate sold by Georgia-Pacific Corp. The sample was labeled E5077 by Georgia-Pacific Corp.

TABLE 1

ADSORPTION REDUCTION OF SURFACTANT ON CRUSHED LIMESTONE CORE

| Ex. | Surfactant | Adsorption, mg/g | Adsorption Reduction, % |
|---|---|---|---|
| 1 | 1.0 wt % Solubilizer | 0.91 | — |
| 2 | 1.0 wt % solubilizer/ 0.5 wt % GP-E5077 | 0.02 | 98 |
| 3 | 2.5 wt % Surfactant System | 1.63 | — |
| 4 | 2.5 wt % Surfactant System/ 2% GP-E5077 | 0.39 | 76 |

Brine: 67,576 ppm, 3744 ppm calcium and magnesium.

The adsorption for the 1.0% percent solubilizer solution of LN-60COS was reduced almost 100% by the 0.5 wt % lignosulfonate-acrylic acid copolymer added in Example 2. A greater amount of the graft copolymer was required to reduce adsorption of the solubilizer surfactant system. However, the 76% adsorption reduction for the surfactant system is considered a good result since that particular surfactant system is very adsorptive and the adsorption of petroleum sulfonates is more difficult to reduce in a limestone environment.

EXAMPLES 5-19

The reduction adsorption of 0.5% by weight solutions of NES-25 surfactant was examined with several different lignosulfonate-acrylic acid graft copolymers employed as sacrificial agents. The brine employed included 36,000 ppm TDS with 2124 ppm calcium and magnesium ions.

The different graft copolymers employed were: Kelig 4000, D-379-11, and a series of Georgia-Pacific supplied graft copolymers labeled GP-E5077, GP-E5078, GP-E5079, GP-E5080, GP-E5085 and GP-E5086. The adsorption reduction of Lignosite 100 was also tested.

NES-25 is a trademarked ethoxysulfonate surfactant having nine to eleven carbon atoms in the aliphatic chain and an average of about 2.5 ethylene oxide groups sold by Henkel Corp. Kelig 4000 is a trademarked lignosulfonate-acrylic acid graft copolymer sold by Daishowa Chemical Co. having 43% acrylic acid by weight. D-379-11 is a trademarked graft copolymer sold by Daishowa Chemical Co., which is a higher molecular weight version of the Kelig 4000, and has the same 43% by weight acrylic acid content. The Georgia-Pacific supplied samples labeled E5077 through E5086 were lignosulfonate-acrylic acid graft copolymer samples supplied by Georgia-Pacific Corporation which contain from 5.66 wt % to 50 wt % acrylic acid. The higher numbers have higher amounts of acrylic acid as noted in Table 2. These samples were prepared by reacting the calcium salt of Lignosite 100 with different amounts of acrylic acid. The molecular weight of Lignosite 100 ranges from about 10,000 to 40,000. Thus, it is believed that the E5077 through E5086 samples have molecular weights ranging from about 10,000 to 80,000.

TABLE 2
REDUCTION OF NES-25 ADSORPTION ON CRUSHED LIMESTONE CORE

| Ex. | Additive, wt % | Adsorption, mg/g | % Acrylic acid | Adsorption Reduction, % |
|---|---|---|---|---|
| 5 | None | 0.58[1] | — | — |
| 6 | 0.5% Kelig 4000 | 0.14 | 43 | 76 |
| 7 | 0.5% D-379-11 | 0.08 | 43 | 86 |
| 8 | 0.5% Lignosite 100 | 0.49 | 0.00 | 16 |
| 9 | 0.5% GP-E5077 | 0.03 | 5.66 | 95 |
| 10 | 0.5% GP-E5078 | 0.08 | 9.09 | 86 |
| 11 | 0.5% GP-E5079 | 0.02 | 13.04 | 97 |
| 12 | 0.5% GP-E5080 | −0.04 | 23.08 | 100 |
| 13 | 0.1% Lignosite 100 | 0.46 | 0.00 | 21 |
| 14 | 0.1% GP-E5077 | 0.28 | 5.66 | 52 |
| 15 | 0.1% GP-E5078 | 0.29 | 9.09 | 50 |
| 16 | 0.1% GP-E5079 | 0.23 | 13.04 | 60 |
| 17 | 0.1% GP-E5080 | 0.03 | 23.08 | 95 |
| 18 | 0.1% GP-E5085 | 0.04 | 33.33 | 93 |
| 19 | 0.1% GP-E5086 | −0.02 | 50.00 | 100 |

NES-25 concentration 0.5 wt %.
[1] Average of four measurements.
Brine: 36,000 ppm TDS, 2124 ppm calcium and magnesium.

A 0.5 wt % concentration of Kelig 4000 and D-379-11 was found to reduce the adsorption of 0.5 wt % NES-25 on the San Andres limestone core by 76% and 86%, respectively. This adsorption reduction was about the same as that obtained with a 2% by weight oxidized lignosulfonate sold under the trademark Marasperse 92 ZCAA by Marasperse Chemical Co., but at a one-fourth concentration of sacrificial agent. However, as the Kelig 4000 and D-379-11 contained about 43% acrylic acid by weight, they may be too expensive to use as sacrificial agents.

Much better results were achieved with the Georgia-Pacific supplied compounds polymerized from Lignosite 100. Surfactant adsorption was reduced 95% with 0.5 wt % of a lignosulfonate graft copolymer containing only 5.66% acrylic acid in Example 9. Examples 11 and 12 also provided strong results with surfactant adsorption reductions of 97% to 100% with graft copolymers containing 13% and 23% acrylic acid by weight, respectively.

Examples 13-19 were run with much smaller concentrations of the graft copolymer sacrificial agent. Exceptional results were obtained with Examples 17-18 where surfactant adsorption was reduced 93% to 95% with only 0.1% by weight of the sacrificial agent. As is apparent from Table 2, the concentration of the lignosufonate-acrylic acid graft copolymer and the amount of acrylic acid can be optimized to give the lowest cost overall for the sacrificial agent.

EXAMPLES 20-32

The lignosulfonate-acrylic acid graft copolymers were also tested for reduction of adsorption for a solubilizer surfactant system on the same limestone matrix. The Salem surfactant system employed in Examples 3-4 was chosen as a typical solubilizer surfactant system for this test. Concentrations of 1.0 wt % and 2.5 wt % of the graft copolymers were prepared and equilibrated with the 2.5 wt % Salem surfactant system and the crushed limestone matrix. Table 3 illustrates the results.

TABLE 3
REDUCTION OF SALEM SURFACTANT SYSTEM ADSORPTION ON CRUSHED LIMESTONE CORE

| Ex. | Additive, wt % | Adsorption, mg/g | % Acrylic acid | Adsorption Reduction, % |
|---|---|---|---|---|
| 20 | None | 0.98 | 0.00 | — |
| 21 | 1.0% Lignosite 100 | 0.64 | 0.00 | 35 |
| 22 | 1.0% GP-E5077 | 0.41 | 5.66 | 58 |
| 23 | 1.0% GP-E5078 | 0.15 | 9.09 | 85 |
| 24 | 1.0% GP-E5079 | 0.10 | 13.04 | 90 |
| 25 | 1.0% GP-E5080 | 0.05 | 23.08 | 95 |
| 26 | 1.0% GP-E5085 | −0.05 | 33.33 | 100 |
| 27 | None | 0.73 | 0.00 | 0 |
| 28 | 2.5% Lignosite 100 | 0.71 | 0.00 | 3 |
| 29 | 2.5% GP-E5077 | 0.11 | 5.66 | 85 |
| 30 | 2.5% GP-E5078 | −0.10 | 9.09 | 100 |
| 31 | 2.5% GP-E5079 | −0.35 | 13.04 | 100 |
| 32 | 2.5% GP-E5080 | −0.17 | 23.08 | 100 |

Salem surfactant system: 0.9 wt % TRS-18; 0.9 wt % TRS-40; 0.7 wt % LN-60COS.
Brine: 67,566 ppm TDS; 3744 ppm calcium and magnesium.

Examples 24-25 and 30-31 had Outstanding adsorption reductions. For the 1% sacrificial agent concentrations of Examples 24-25, the copolymers having 13% and 23% acrylic acid gave adsorption reductions of 90% and 95%, respectively. Although the 2.5% sacrificial agent examples of 30-31 gave 100% adsorption reductions with lower concentrations of the more costly acrylic acid (9% and 13%), it must be remembered that such 2.5% solutions of sacrificial agent have a raw materials cost almost 2.5 times that of 1% sacrificial agent solutions having approximately the same acrylic acid content.

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A method of recovering hydrocarbons from a subterranean hydrocarbon formation which is penetrated by at least one injection well and at least one production well wherein a surfactant system is injected into the formation to sweep oil through the formation to at least one production well, which comprises:

injecting into the formation a solution containing about 0.02% to about 5% by weight of a sacrificial agent designed to prevent the loss to the formation of chemicals in an injected surfactant system, said sacrificial agent comprising a lignosulfonate-acrylic acid graft copolymer having about 2% to about 70% by weight of acrylic acid; and injecting into the formation a surfactant system to sweep hydrocarbons to a production well for recovery.

2. The method of claim 1, wherein said chemicals in the injected surfactant system are selected from the group consisting of surfactants, solubilizers, and polymers.

3. The method of claim 1, wherein the sacrificial agent is coinjected into the formation in solution with said chemicals of the surfactant system.

4. The method of claim 1, wherein the sacrificial agent is injected into the formation prior to the injection of chemicals in the surfactant system.

5. The method of claim 1, wherein the sacrificial agent is injected into the formation after the injection of chemicals in the surfactant system.

6. The method of claim 1, wherein the graft copolymer has about 5% to about 40% acrylic acid by weight.

7. The method of claim 1, wherein about 0.01 to about 0.5 pore volumes of solution containing a sacrificial agent is injected into the formation.

8. The method of claim 1, wherein the sacrificial agent has a concentration of about 0.1% to about 3% by weight.

9. A method of recovering hydrocarbons from a subterranean hydrocarbon formation which is penetrated by at least one injection well and at least one production well wherein a surfactant system is injected into the formation to sweep oil through the formation to at least one production well, which comprises:

injecting into the formation a surfactant system to sweep hydrocarbons to a production well for recovery, said surfactant system comprising about 0.1% to about 3% by weight of a sacrificial agent designed to prevent the loss to the formation of chemicals in an injected surfactant system, said sacrificial agent comprising a lignosulfonate-acrylic acid graft copolymer having about 5% to about 40% by weight of acrylic acid.

* * * * *